United States Patent
Hermange et al.

(10) Patent No.: US 12,319,031 B2
(45) Date of Patent: Jun. 3, 2025

(54) COMPOSITE PANE COMPRISING ELECTRICAL COMPONENT WITH PROTECTIVE COATING

(71) Applicant: SAINT-GOBAIN GLASS FRANCE, Courbevoie (FR)

(72) Inventors: Francois Hermange, Aachen (DE); Clément Bottois, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 497 days.

(21) Appl. No.: 17/633,731

(22) PCT Filed: Jul. 17, 2020

(86) PCT No.: PCT/EP2020/070304
§ 371 (c)(1),
(2) Date: Feb. 8, 2022

(87) PCT Pub. No.: WO2021/023497
PCT Pub. Date: Feb. 11, 2021

(65) Prior Publication Data
US 2022/0288894 A1    Sep. 15, 2022

(30) Foreign Application Priority Data
Aug. 8, 2019 (EP) .................................. 19190633

(51) Int. Cl.
*B32B 15/04* (2006.01)
*B32B 17/06* (2006.01)
*B32B 17/10* (2006.01)

(52) U.S. Cl.
CPC .. *B32B 17/10165* (2013.01); *B32B 17/10036* (2013.01); *B32B 2255/26* (2013.01); *B32B 2605/006* (2013.01)

(58) Field of Classification Search
CPC ................................................ B32B 17/10036
(Continued)

(56) References Cited

U.S. PATENT DOCUMENTS

| 6,559,419 B1 * | 5/2003 | Sol | ............................ H05B 3/84 |
| | | | 52/171.2 |
| 10,082,716 B2 * | 9/2018 | Mennig | .............. B32B 17/10174 |

(Continued)

FOREIGN PATENT DOCUMENTS

| CN | 106997482 A | 8/2017 |
| CN | 108348071 A | 7/2018 |

(Continued)

OTHER PUBLICATIONS

International Search Report as issued in International Patent Application No. PCT/EP2020/070304, dated Sep. 8, 2020.
(Continued)

*Primary Examiner* — Lauren R Colgan
(74) *Attorney, Agent, or Firm* — Pillsbury Winthrop Shaw Pittman LLP

(57) ABSTRACT

A composite pane with at least one integrated electrical component includes an outer pane with an outer face and an inner face, an inner pane with an outer face and an inner face, wherein the inner face of the outer pane and the inner face of the inner pane are connected by a thermoplastic interlayer, wherein the electrical component is integrated between the inner face of the outer pane and the inner face of the inner pane and electrically contacted by at least one conductive track, wherein at least one portion of the exposed surface of the electrical component and optionally at least one portion of the exposed surface of the conductive track is continuously covered by a polymeric protective coating.

19 Claims, 3 Drawing Sheets

Figure 1A:
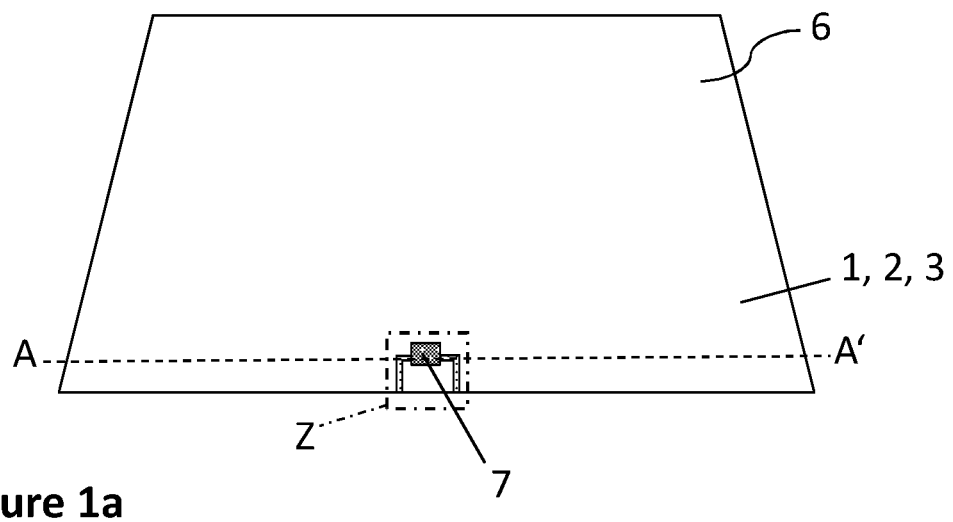

(58) Field of Classification Search
USPC .................................................. 428/428, 426
See application file for complete search history.

(56) References Cited

U.S. PATENT DOCUMENTS

| | | | | |
|---|---|---|---|---|
| 10,190,363 | B2* | 1/2019 | Behmke | E06B 9/24 |
| 10,532,636 | B2* | 1/2020 | Miyasaka | B32B 27/302 |
| 10,919,269 | B2* | 2/2021 | Dröge | B32B 17/10504 |
| 11,312,111 | B2* | 4/2022 | Klein | B32B 17/10779 |
| 2006/0208906 | A1 | 9/2006 | Kokuryo et al. | |
| 2008/0203079 | A1* | 8/2008 | Veerasamy | H05B 3/84 |
| | | | | 219/203 |
| 2008/0318011 | A1* | 12/2008 | Chaussade | B32B 17/1077 |
| | | | | 428/210 |
| 2010/0020381 | A1* | 1/2010 | Legois | B32B 17/1077 |
| | | | | 359/275 |
| 2012/0307337 | A1* | 12/2012 | Bartug | B32B 17/10302 |
| | | | | 359/245 |
| 2013/0092676 | A1* | 4/2013 | Offermann | B32B 17/10036 |
| | | | | 219/203 |
| 2014/0151355 | A1* | 6/2014 | Lisinski | B32B 17/1077 |
| | | | | 156/99 |
| 2015/0298431 | A1* | 10/2015 | Von Der Weiden | |
| | | | | B32B 17/10036 |
| | | | | 156/306.6 |
| 2015/0301367 | A1* | 10/2015 | Mennig | B32B 17/10761 |
| | | | | 156/60 |
| 2017/0040662 | A1* | 2/2017 | Dai | H01Q 5/371 |
| 2018/0192477 | A1* | 7/2018 | Klein | B32B 17/10385 |
| 2019/0134954 | A1 | 5/2019 | Bauerle et al. | |

FOREIGN PATENT DOCUMENTS

| | | |
|---|---|---|
| CN | 109952220 A | 6/2019 |
| EP | 1 688 284 A2 | 8/2006 |
| JP | 2006-244317 A | 9/2006 |
| JP | 2010-509132 A | 3/2010 |
| JP | 2016-507858 A | 3/2016 |
| JP | 2019-521063 A | 7/2019 |
| WO | WO 2014/044410 A1 | 3/2014 |
| WO | WO 2014/122704 A1 | 8/2014 |
| WO | WO 2016/116372 A1 | 7/2016 |
| WO | WO 2017/097536 A1 | 6/2017 |
| WO | WO 2017/103428 A1 | 6/2017 |
| WO | WO 2017/203132 A1 | 11/2017 |

OTHER PUBLICATIONS

First Examination Report as issued in Indian Patent Application No. 202217003197, dated Apr. 11, 2022.
Notice of Reasons for Rejection as issued in Japanese Patent Application No. 2022-507736, dated Mar. 14, 2023.
Notice of Reasons for Rejection as issued in Japanese Patent Application No. 2022-507736, dated Sep. 19, 2023.
Final Notice of Reasons for Rejection as issued in Japanese Patent Application No. 2022-507736, dated Mar. 5, 2024.
Notice of Preliminary Rejection as issued in Korean Patent Application No. 10-2022-7002153, dated Oct. 4, 2024.

* cited by examiner

COMPOSITE PANE COMPRISING ELECTRICAL COMPONENT WITH PROTECTIVE COATING

CROSS-REFERENCE TO RELATED APPLICATIONS

This application is the U.S. National Stage of PCT/EP2020/070304, filed Jul. 17, 2020, which in turn claims priority to European patent application number 19 190 633.8 filed Aug. 8, 2019. The content of these applications are incorporated herein by reference in their entireties.

The invention relates to a composite pane with at least one electrical component with protective coating, a method of its production and its use.

Automotive glazing is often equipped with electrical conducting structures for heater function or antenna function. Electrical conducting structures can be e.g. applied on glass panes by printing a silver containing paste onto the glass surface and subsequent burning in of the paste. These conductive structures are connected to the on-board electronics by electrical connectors soldered on bus bars. Within modern automotive glazing a wide branch of different electronic components is needed to implement the functions desired by the end-user, e.g. LED, resistors, capacitors, optoelectronic devices, sensors and antennas.

Composite panes for automotive applications are mostly used as windshields, which comprise an outer glass pane and an inner glass pane laminated by a thermoplastic interlayer. The thermoplastic interlayer bonds the glass panes to each other and can also be equipped with various electronic components.

WO 2017/097536 discloses a composite pane with light sensor comprising a photo diode, wherein the photo diode is integrated within the thermoplastic interlayer, which laminates the outer pane and the inner pane of the composite pane.

In WO 2016/116372 a composite pane with a touch sensor comprising a capacitive area to control electrical devices, e.g. optically switchable glazing, is disclosed. The capacitive sensor comprises a structured electrically conductive layer on a carrier foil. The carrier foil is inserted between two lamination films forming the thermoplastic interlayer.

An attractive design of automotive glazing with a maximum transparent area of the glazing is desired by customers. Thus, the implemented electrical components and the black print used to conceal them must not disturb the attractive visual appearance of the glazing. Therefore, the size and spacing of electrical components and conductive tracks has to be minimized bearing a higher risk of short-circuits.

US 2012/0307337 A1 disclosed a composite pane comprising an electrically switchable SPD-film, wherein the perimeter edge of the SPD-film is secured by a polyimide film as edge material.

A heatable composite glazing is for example disclosed in US 2013/0092676 A1, which describes a composite pane with heatable coating electrically connected by at least two busbars. The busbars are electrically connected to feed lines provided for connection to the poles of a voltage source. As feed lines foil conductors can be used. These foil conductors are for example made of tinned copper strips applied to a carrier material made of plastic or laminated therewith on both sides for electrical insulation and stabilization. The insulation material contains a polyimide-based film.

US 2018/0192477 A1 is directed to a composite glazing with a capacitive sensor, wherein the capacitive sensor is formed by a carrier film having an electrically conductive layer. The electrically conductive layer forms a capacitive switching region having a contact region, a supply line region, and a connection region. The supply line region electrically connects the contact region to the connection region that can be electrically connected to a sensor electronics system. The connection region is electrically connected to a foil conductor, which can be guided out via the bottom edge of the composite pane. The foil conductor can be made of copper foil, which can be insulated outside the connection region with a polyimide layer.

In EP 1688284 A2 a heatable windshield is described, which comprises a defrosting/defogging mechanism formed by a plurality of wires extending across the windshield between two busbars. The busbars are connected to a power source via an electrical connector extending out of the windshield. The electrical connector is an electrically conductive wire covered by a heat-protective polyimide-based coating.

The object of the present invention is to provide a composite pane with integrated electrical components, wherein the risk of short-circuits is minimized.

The solution of the object of the present invention is a composite pane with electrical components equipped with a protective coating, a method for its production and its use according to independent claims 1, 12 and 15.

The composite pane according to the invention is a laminated glazing comprising an outer pane and an inner pane, which are adhered to each other by a thermoplastic interlayer. The outer pane and the inner pane comprise an outer face and an inner face each. The outer face of the inner pane (also referred to as "face IV") is directed to an interior space, which is separated from the surroundings by the composite pane. The inner face of the inner pane (also referred to as "face III") is directed to the inner face of the outer pane (also referred to as "face II"), which are affixed to each other by the thermoplastic interlayer. The outer face of the outer pane (referred to as "face I") is oriented towards the surroundings. The composite pane comprises at least one electrical component, which is integrated within the composite pane between the inner face of the outer pane and the inner face of the inner pane. Thus, the electrical component is enclosed at least by the thermoplastic interlayer or by the thermoplastic interlayer and at least one of the panes, depending on the substrate to which the electrical component is attached. The electrical component is electrically connected to at least one conductive track, by which the power supply of the electrical component is ensured. The at least one conductive track comprises two opposing surfaces, which are essentially parallel to each other and to the faces of the outer pane and the inner pane. The conductive track is bonded to an underlying substrate by conclusively substance-to-substance bonding. Therein the inner face of the inner pane, the inner face of the outer pane or a layer of the thermoplastic interlayer can act as underlying substrate. The surface of the conductive track, which is opposite to the surface bonded to the substrate, is defined as the exposed surface of the at least one conductive track. Analogous to this, the electrical component comprises also two opposing surfaces, which are essentially parallel to each other and to the faces of the outer pane and the inner pane. The electrical component is attached by one of these opposing surfaces to an underlying substrate and/or to the conductive track by conclusively substance-to-substance bonding. The inner face of the inner pane, the inner face of the outer pane or a layer of the thermoplastic interlayer can act as underlying substrate, wherein the electrical component is usually attached to the same substrate surface as the conductive track. The surface of the electrical component, which is not bonded to a substrate or to the conductive track, is defined as exposed surface of the electrical component. In general, the exposed surface is the surface of the electrical component being opposite to the bonding surface. In addition to this, sub-areas of the bonding surface, which are not firmly bonded to the underlying substrate, also represent an exposed surface. According to the invention at least one portion of the exposed surface of the electrical component is completely covered by a polymeric protective coating. Optionally at least one portion of the exposed surface of the conductive track is also completely covered by a polymeric protective coating in addition to the polymeric protective coating of the electrical component. Completely covered means that within the application area a continuous coating is formed without any interruptions. The application of a polymeric protective coating is particularly advantageous as the spacing of conducting portions can be much closer and short-circuits are avoided by the insulating properties of the polymeric protective coating. Furthermore, the exposed surfaces of the electric component and optionally the conductive track are protected against environmental stress and chemical and corrosive attack. Hence, performance degradation due to environmental hazards is at least minimized. The polymeric protective coating has a negligible effect on the component weight. Surprisingly, the inventors observed that the lamination of electrical components within a composite pane is improved by application of a polymeric protective coating. The polymeric protective coating forms a tight enclosure of the electrical components, which prevents residual air entrapped adjacent to the electrical components. Compared to this, without a polymeric protective coating cavities between electric component and adjacent structures have to be filled by the material of the thermoplastic interlayer during lamination process. This is often not possible and leads to entrapped air inside the composite pane.

Preferably the composite pane is a vehicle glazing for separation of the vehicle interior and the vehicle surroundings. The composite pane as vehicle glazing is used as window pane, which is inserted or may be inserted into a window opening of the car body. The inner pane is the pane, which is oriented towards the vehicle interior when attached to a car body. The outer pane is defined as the pane that is in direct contact with the environment after assembly.

In an advantageous embodiment the polymeric protective coating is applied at least within all regions of the exposed surface of the electrical component. Thus the electrical component can be equipped with a closer conductor spacing, which allows small sized electrical components. Nevertheless, alternatively the person skilled in the art might leave some particular parts uncoated, e.g. light sources.

Preferably the polymeric protective coating comprises amorphous fluoropolymers, fluorinated poly-paraxylylene, non-fluorinated poly-paraxylylene, polyurethane, polyimide, acrylic resin, epoxy resin and/or mixtures or copolymers thereof. These polymers are suitable concerning their adhesion to polymeric substrates and/or glass substrates and are suitable for application as solution or dispersion and thus easy to handle.

Preferably the polymeric protective coating is colorless and transparent, which is advantageous in view of coating areas which might extend to the transparent viewing area of the glazing. Amorphous fluoropolymers, poly-paraxylylenes, polyurethanes, acrylic resins and epoxy resins are each available as transparent polymer compositions.

Most preferably the polymeric protective coating comprises acrylic resins, epoxy resins, polyurethanes and or mixtures or copolymers thereof. These materials have shown good compatibility to the commonly used lamination films of the thermoplastic interlayer. Acrylic resins show a good electrical insulation resistance, moisture resistance and can be processed by use of solvents, which are tolerable under ecological aspects. Epoxy resins show a high adhesion, very good chemical resistance and good water resistance. Polyurethanes also show a good resistance to chemicals, solvents and moisture and are abrasion resistant. Furthermore, urethane acrylate compoundings are available, which are free of volatile organic components (VOC) and are curable via ultraviolet light, which leads to short process times. Urethane acrylate based coatings are also moisture resistant and chemical resistant.

The thickness of the polymeric protective coating is between 25 µm and 250 µm, preferably between 25 µm and 100 µm, most preferably between 40 µm and 70 µm. Within these ranges it is ensured that on the one hand a continuous layer can be achieved and on the other hand the thickness of the electrical component is not increased too much.

Preferably the polymeric protective coating has been applied as a wet coating. This is advantageous as a wet coating guarantees an almost complete coverage of the electrical component by entering even small cavities between electrical component and underlying substrate. This is important in cases where the electric component is attached by a substance-to-substance bonding to an underlying conductive track in a first sub-area of a bonding surface, while another sub-area of the bonding surface stays an exposed surface. This exposed surface is inaccessible for various possible covering means, while a liquid can easily enter the cavity.

The wet coating comprises the polymeric component of the polymeric protective coating and in addition to this at least one solvent, which evaporates during the curing of the polymeric protective coating. Furthermore, one or more additives might be present. Suitable solvents and additives are known to the person skilled in the art. As a solvent for example propyl acetate and acetone are used as they have a good solubility for synthetic resins, for example in case of acrylic coatings. Furthermore, propyl acetate is biologically degradable. In case of for example polyurethane coatings tetrahydrofuran, xylene and/or ethylbenzene are suitable example of solvents. Depending on the processing and application of the coating, the wet coating might contain additives as e.g. 1,1,1,2-Tetrafluorethan as propellant for spray coating applications. Other useful additives might be ultraviolet fluorescing tracers, which simplify quality control concerning a continuous coating application.

Polymeric wet coatings suitable for elaborating the invention are commercially available, e.g. for spray application.

In one preferred embodiment of the invention, the at least one electrical component and/or the at least one conductive track are applied on the inner face of the outer pane or on the inner face of the inner pane. This is for example the case if the electrical component has to be applied directly onto the glass surfaces of the inner pane or the outer pane. A direct application onto a glass substrate can be advantageous for example in case of conductive structures that are easily printable on glass using a conductive printing paste. Furthermore, there are various conductive coatings known in the state of the art, which can easily be deposited onto a glass surface by physical vapor deposition, magnetron sputtering and similar methods. If for example sub-areas of such coatings are used as conductor tracks, the electrical component could be attached to the coating and is located on the inner face of the outer pane or the inner pane.

In another preferred embodiment the thermoplastic interlayer comprises at least one lamination film on which the at least one electrical component and/or the at least one conductive track are applied. Locating the electric components on the lamination films of the thermoplastic interlayer increases the degree of prefabricated components and thus helps to decrease the production time of the composite pane. The at least one lamination foil of the thermoplastic interlayer can be already equipped with conductive tracks and electrical components on a supply line. Within the glazing manufacturing line, the prefabricated thermoplastic interlayer as a whole, including all electrical components, is placed on one of the panes, covered by the other pane and laminated to yield a composite pane. This is also particularly favorable to minimize manufacturing defects of the composite pane as all electrical components can be assembled and tested already within the preassembled thermoplastic interlayer. The thermoplastic interlayer may contain one lamination film or several lamination films depending on the embodiment and size of the electrical component. To enhance the adhesion between electrical component and the adjacent pane of the glazing, at least one second lamination film can be inserted between the exposed surface of the electrical component, which is equipped with the polymeric protective coating, and the adjacent pane. Nevertheless, even if the electrical component with polymeric protective coating is directly adjacent to a glass pane (without lamination film in between), the adhesion is slightly enhanced and the amount of entrapped air is reduced due to the polymeric protective coating.

In another preferred embodiment the at least one electrical component and/or the at least one conductive track are attached on a carrier foil, which is inserted into the foil stack of the thermoplastic interlayer. The thermoplastic interlayer contains at least one lamination film and the carrier foil, on which the electrical component and/or the at least one conductive track are applied. If just one lamination film is present, the carrier foil has to be positioned adjacent to the inner face of the inner pane or the inner face of the outer pane. In case of at least two lamination films, the carrier foil is preferably inserted between the lamination films. Concerning prefabrication of components and adhesion, the same advantages apply as discussed for electrical components attached to a lamination film.

If an electrical component is attached directly on a lamination film or added to the stack of the thermoplastic interlayer by a carrier foil, depends on the embodiment of the electrical component itself. Various electrical components are available commercially as ready-to-use components. Some of them are already supplied as carrier foil with electrical component. Typical examples for this are sensors (e.g. touch sensor containing conductive thin film coating on carrier foil) or optoelectronic devices (e.g. PDLC devices containing an active layer between two surface electrodes, which are applied to carrier foils).

The electrical component has a thickness of 70 µm to 700 µm, preferably 100 µm to 500 µm. The thickness of the electrical component predominantly depends on the embodiment of the electrical component and is easily derivable by the person skilled in the art as soon as the electrical component to be implemented is known.

The at least one electrical component is selected out of the group of LEDs (light emitting diodes), diodes, resistors, capacitors, transistors, integrated circuits, optoelectronic devices, inductors, sensors, displays, LC devices (liquid crystal devices), PDLC devices (polymer dispersed liquid crystal devices), antenna, piezoelectric elements and crystal elements.

The conductive tracks are implemented as paste, solid ribbons, bus bars, wires and/or thin conductive coatings. The conductive tracks contain copper, silver, graphite, graphene, gold, aluminum, tungsten, tin, zinc and/or mixtures or alloys thereof. Such embodiments of conductive tracks are well known in the state of the art.

Conductive tracks implemented as paste are for example printed with conductive silver paste followed by a baking step. Such printing pastes are commercially available and contain high contents of silver or silver alloys, for example between 30 to 88% silver in weight. Other contents are organic binders, organic solvents and optionally other additives. The thickness of the silver print is usually between 25 µm to 100 µm, preferably 30 µm to 80 µm measures as thickness of the wet print.

Bus bars can for example be either implemented as conductive silver print or also as flat conductors, which are attached to the underlying substrate.

Thin conductive coatings are preferably designed as transparent, electrically conductive layers. Thin conductive coatings preferably contain at least a metal, a metal alloy, or a transparent conductive oxide (TCO). Typically, conductive coatings suitable in terms of the invention contain, for example, silver, gold, copper, nickel, chromium, tungsten, indium tin oxide (ITO), gallium-doped or aluminum-doped zinc oxide, and/or fluorine-doped or antimony-doped tin oxide. Preferably those coatings have a thickness of 10 nm to 2 µm, particularly preferably from 20 nm to 1 µm, most particularly preferably from 30 nm to 500 nm.

The electrical component and the at least one conductive track are electrically connected to each other. The electrical connection between conductive tracks and electrical components is established by means known to the person skilled in the art. The electrical component can be soldered, welded or glued by a conductive glue onto the conductive track, preferably soldered or glued by conductive glue.

The at least one carrier film preferably contains at least one polymer, particularly preferably a polyester film, most preferably polyethylene terephthalate (PET). This is particularly advantageous in terms of stability of the carrier film and the thermoplastic interlayer. The carrier films can, however, also contain or be made of other polymers, for example, ethylene vinyl acetate (EVA), propylene, polycarbonate, polymethyl methacrylate, polyacrylate, polyvinyl chloride, polyacetate resin, casting resins, acrylates, fluorinated ethylene propylenes, polyvinyl fluoride, and/or ethylene-tetrafluoroethylene. The thickness of each carrier film is preferably from 0.05 mm to 1 mm, particularly preferably from 0.1 mm to 0.2 mm.

The thermoplastic interlayer can, for example, be formed by a single lamination film. The thermoplastic interlayer can also be formed as a two layer, three layer, or multilayer film stack, wherein the individual lamination films have the same or different properties. A thermoplastic interlayer can also be formed from sections of different thermoplastic lamination films having adjacent side edges.

The at least one lamination film is constructed from a thermoplastic selected from the group consisting of polyvinyl butyral (PVB), ethylene vinyl acetate (EVA), polyurethane (PU), polypropylene (PP), polyacrylate, polyethylene (PE), polycarbonate (PC), polymethyl methacrylate (PMMA), polyvinyl chloride (PVC), polyacetate resin, casting resins, polyacrylates, fluorinated ethylene-propylene copolymers, polyvinyl fluoride, and/or ethylene-tetrafluoroethylene copolymers or are made from at least one of these thermoplastics. PVB is particularly preferably used.

The thickness of each lamination film is preferably between 0.2 mm to 2 mm, preferably between 0.3 mm to 1 mm, for example 0.38 mm, 0.76 mm, 0.81 mm or 0.84 mm.

The lamination films of the thermoplastic interlayer can be colored, can absorb UV and/or IR radiation and/or can be equipped with various functional coatings known within the state of the art.

In case of several lamination films, the lamination films of the thermoplastic interlayer are preferably aerially arranged one atop another and laminated to one another, with optionally a carrier foil in between those lamination films. The regions of the lamination films overlapping a carrier foil form the regions that join the carrier foil with the attached electrical component to the panes. In other regions of the pane, where the lamination films are in direct contact with one another, they can fuse during lamination such that the two original layers are possibly no longer discernible and there is, instead, one homogeneous intermediate layer.

The composite pane according to the invention can advantageously be implemented as a windshield. Such a windshield has an upper edge and a lower edge as well as two side edges extending between the upper edge and the lower edge. "Upper edge" refers to that edge that is intended to point upwards in the installation position. "Lower edge" refers to that edge that is intended to point downwards in the installation position. The upper edge is often referred to as the "roof edge"; the lower edge as the "engine edge".

Windshields have a central field of vision, the optical quality of which is subject to high requirements. The central field of vision must have high light transmittance (typically greater than 70%). Said central field of vision is, in particular, that field of vision that is referred to by the person skilled in the art as field of vision B, vision area B, or zone B. The field of vision B and its technical requirements are specified in Regulation No. 43 of the Economic Commission for Europe of the United Nations (UN/ECE) (ECE-R43, "Uniform Provisions concerning the Approval of Safety Glazing Materials and Their Installation on Vehicles"). There, the field of vision B is defined in Annex 18.

The windshield is preferably provided for a motor vehicle, particularly preferably for passenger car.

The upper edge and the side edges or all side edges of the composite pane are concealed in vision through the composite pane preferably by an opaque masking print (also referred to as black print) or by an outer frame. Wndshields typically have a circumferential peripheral masking print made of an opaque enamel, which serves in particular to visually conceal the adhesive used for installation of the window and to protect it against UV radiation. Such peripheral masking print can also be used to also conceal necessary electrical connections of the electrical component or, depending on the application, the electrical component itself. Preferably, both the outer pane and also the inner pane have a masking print such that through-vision is prevented from both sides.

The outer pane and the inner pane are preferably made of glass, particularly preferably of soda lime glass, as is customary for window panes. The panes can, however, also be made of other types of glass, for example, quartz glass, borosilicate glass, or aluminosilicate glass, or rigid clear plastics, for example, polycarbonate or polymethyl methacrylate. The panes can be clear, or also tinted or colored. Windshields must have adequate light transmittance in the central field of vision, preferably at least 70% in the primary through-vision zone A per ECE-R43.

The outer pane, the inner pane, and/or the lamination films of the thermoplastic interlayer can have further suitable coatings known per se, for example, antireflection coatings, nonstick coatings, anti-scratch coatings, photocatalytic coatings, or solar protection coatings, or low-E coatings.

The thickness of the outer pane and the inner pane can vary widely and thus be adapted to the requirements of the individual case. The outer pane and the inner pane preferably have thicknesses of 0.5 mm to 5 mm, particularly preferably of 1 mm to 3 mm.

The invention also includes a method for producing a composite pane according to the invention, wherein at least
   a) an outer pane, an inner pane, at least one lamination film and optionally a carrier foil are provided and wherein at least one conductive track and at least one electrical component are applied either on the outer pane, the inner pane, the lamination film or the carrier foil,
   b) at least one portion of the at least one electrical component and optionally at least one portion of the at least one conductive track, are coated with a polymeric protective coating,
   c) a stack comprising at least the outer pane, the lamination film, the carrier foil if present and the inner pane is arranged, wherein the at least one lamination film and the carrier foil can be arranged in any succession and
   d) the outer pane and the inner pane are joined by lamination, wherein a thermoplastic interlayer between the outer pane and the inner pane is formed and a composite pane is achieved.

The electrical contacting of the conductive tracks and the electrical component is preferably done before the lamination of the composite pane.

Any prints that are present, for example, opaque masking prints or printed bus bars for the electrical contacting of the electrical component are preferably applied by screen printing.

The lamination is preferably done under the action of heat, vacuum, and/or pressure. Methods known per se can be used for lamination, for example, autoclave methods, vacuum bag methods, vacuum ring methods, calender methods, vacuum laminators, or combinations thereof.

The polymeric protective coating is applied by brush coating, selective coating by machine, dispensing, screen printing, inkjet printing, spraying or gluing of adhesive tape. Preferably the polymeric protective coating is applied as a wet coating. Particular preferably the polymeric protective coating is applied by spraying. This is advantageous as it is easy to apply and able to fill small cavities around the electrical component.

Preferably the at least one electrical component and the at least one conductive track are applied on the lamination film or on the carrier foil, wherein step b) is executed before or during step a). Thus, the carrier foil or lamination film with electrical component is prefabricated. This allows to arrange the complete stack of the thermoplastic interlayer already before step a). In step c) the prefabricated thermoplastic interlayer as a whole can be positioned between the outer and the inner pane, which can be easily automated compared to separate positioning of all foils.

The invention further includes the use of a composite pane according to the invention as vehicle glazing, preferably as windshield of a vehicle.

Figure 1B:
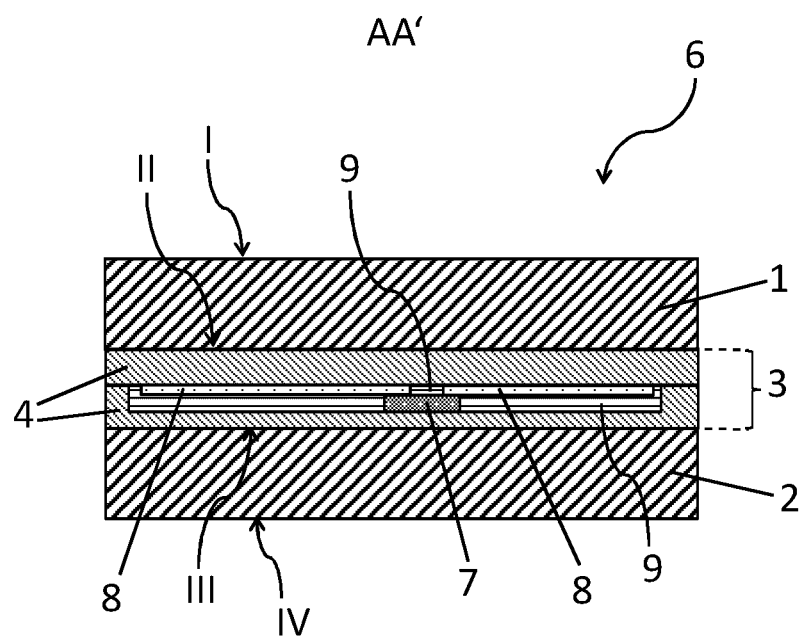
Figure 2A:
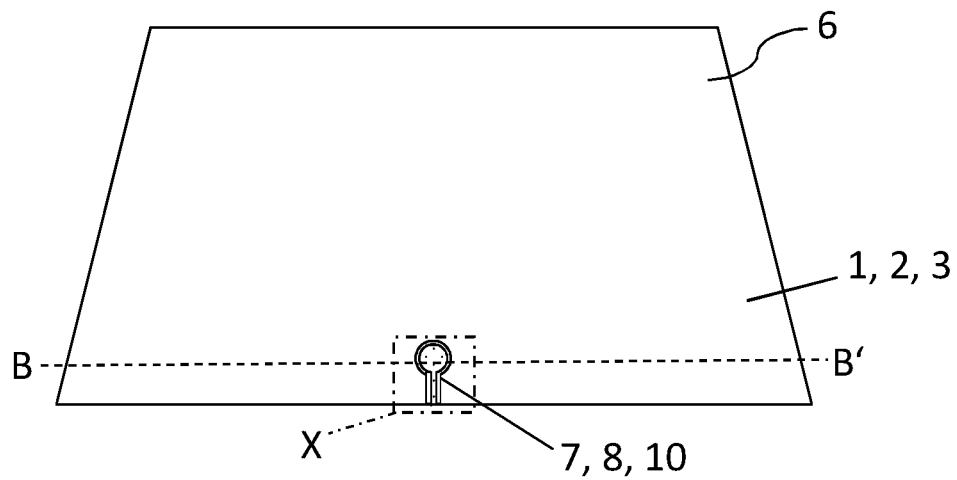
Figure 2B:
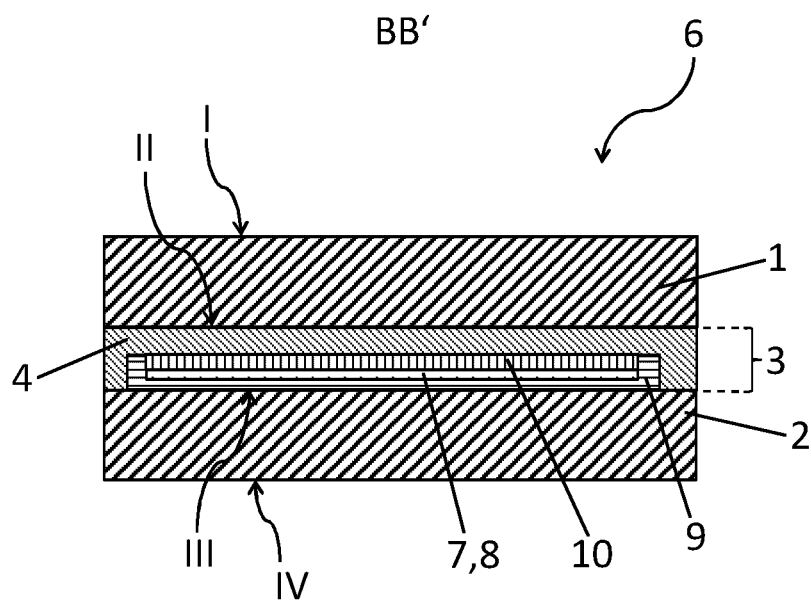
Figure 3:
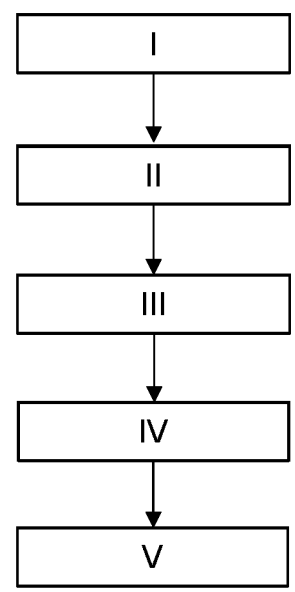

The invention is explained in detail with reference to drawings and exemplary embodiments. The drawings are schematic representations and not true to scale. The drawings in no way restrict the invention. They depict:

FIG. 1a a top view of a composite pane 6 according to the invention, wherein the thermoplastic interlayer 3 comprises an LED as electrical component 7, FIG. 1b a cross section of the composite pane 6 according to FIG. 1a, FIG. 2a a top view of a composite pane 6 according to the invention, wherein the thermoplastic interlayer 3 comprises a touch sensor as electrical component 7 applied on a carrier foil 10, FIG. 2b a cross section of the composite pane 6 according to FIG. 2a, FIG. 3 a flow chart of a process according to the invention.

FIG. 1a depicts a top view of a composite pane 6 according to the invention, wherein the thermoplastic interlayer 3 comprises a light emitting diode (LED) as electrical component 7 and the electrical component 7 is electrically contacted by conductive tracks 8. In FIG. 1b a cross section of the composite pane 6 according to FIG. 1a within section Z along intersection line AA' is shown. The composite pane 6 is a vehicle windscreen comprising an outer pane 1 with an outer face I and an inner face II and an inner pane 2 with an inner face III and an outer face IV. The inner face II of the outer pane 1 and the inner face III of the inner pane 2 are laminated to each other by a thermoplastic interlayer 3. The thermoplastic interlayer comprises two lamination films 4 out of PVB with a thickness of 0.76 mm each. The outer pane 1 and the inner pane 2 consist of soda lime glass with a thickness of 2.1 mm for the outer pane 1 and 1.6 mm for the inner pane 2. The conductive tracks 8 are printed on a surface of one of the lamination films 4, according to FIG. 1b on the lamination film 4 neighboring the outer pane 1, wherein the surface carrying the conductive tracks is oriented towards the second lamination film 4. The conductive tracks 8 are printed by use of a conductive silver containing paste. The electrical component 7 is attached to the conductive tracks 8 by use of a conductive glue (not shown), wherein the electrical component 7 can be connected to a power supply (not shown) via conductive tracks 8. The exposed surface of the conductive tracks 8 is embedded within the polymeric protective coating 9. The exposed surfaces of the electrical component 7 are as well covered by the polymeric protective coating 9, wherein the surface of the electrical component 7, which is facing towards the inner face III of the inner pane 2 is left out. The polymeric protective coating 9 is applied as spray coating, wherein the uncoated surface of the electrical component 7 is masked during the coating process. As the polymeric protective coating 9 is applied as wet coating, the coating is able to enter the exposed surface of the electrical component 7, which is directed to the underlying lamination film 4 to which the electrical component 7 is attached. The polymeric protective coating 9 comprises an acrylic resin and is applied with a coating thickness of approximately 100 µm.

FIG. 2a depicts a top view of a composite pane 6 according to the invention, wherein the thermoplastic interlayer 3 comprises a touch sensor as electrical component 7 applied on a carrier foil 10. In FIG. 2b a cross section of the composite pane 6 according to FIG. 2a along the interception line BB' within sector X is shown. The composite pane 6 is a vehicle windscreen comprising an outer pane 1 with an outer face I and an inner face II and an inner pane 2 with an inner face III and an outer face IV. The inner face II of the outer pane 1 and the inner face III of the inner pane 2 are laminated to each other by a thermoplastic interlayer 3. The thermoplastic interlayer comprises one lamination film 4 out of PVB with a thickness of 0.76 mm. The outer pane 1 and the inner pane 2 consist of soda lime glass with a thickness of 2.1 mm for the outer pane 1 and 1.6 mm for the inner pane 2. The touch sensor as electrical component 7 is formed by an electrically conductive coating applied on the carrier foil 10. The electrically conductive coating is structured by separation lines, which are free of coating, to form a capacitive area of the sensor and a surrounding area of the sensor. The capacitive area comprises a touch panel, which is intended for operating the touch sensor, and a supplying area, which is intended for connection of the sensor to a sensor control unit by means of a conductor. The conductor paths 8 are formed by the supplying area of the sensor in this case. The separation lines and detailed pattern of the touch sensor is not shown as such sensor layouts are well known within the state of the art. The carrier foil 10 consists of a PET film with a thickness of 50 µm. The electrical component 7 is oriented towards the inner face III of the inner pane 2 as the touch sensor shall be operated form the vehicle interior (outer face IV). The polymeric protective coating 9 is applied on the electrically conductive coating of the electrical component 7 by spray coating, wherein the complete exposed surface of the electrical component 7 as well as a part of the directly adjacent surface of the lamination film 4 is covered by the polymeric protective coating 9. The polymeric protective coating 9 comprises an epoxy resin applied with a coating thickness of 25 µm.

FIG. 3 shows a flow chart of a process according to the invention comprising the steps:

I applying an electrical component 7 and/or at least one conductive track 8 on a lamination film 4 or on a carrier foil 10, II coating at least parts of the electrical component 7 and optionally also at least parts of the conductive track 8 with a polymeric protective coating 9, III accumulating the carrier foil 10 or the lamination film 4, on which the electrical component 7 and/or at least one conductive track 8 are applied, with optional further lamination films 4 to form the foil stack subsequently forming the thermoplastic interlayer 3, IV positioning the foil stack of the thermoplastic interlayer 3 onto an outer pane 1 or an inner pane 2 and covering the foil stack with the inner pane 2 or the outer pane 1, V autoclaving the arrangement to form a composite pane 6.

REFERENCES 1 outer pane
2 inner pane
3 thermoplastic interlayer
4 lamination films
6 composite pane
7 electrical component
8 conductive track
9 polymeric protective coating
10 carrier foil
I outer face of outer pane
II inner face of outer pane
III inner face of inner pane
IV outer face of inner pane
AA', BB' intersecting lines
Z, X sectors

The invention claimed is:

1. A composite pane with at least one integrated electrical component at least comprising an outer pane with an outer face and an inner face, an inner pane with an outer face and an inner face, wherein the inner face of the outer pane and the inner face of the inner pane are connected by a thermoplastic interlayer,
   wherein the at least one integrated electrical component is integrated between the inner face of the outer pane and the inner face of the inner pane and electrically contacted by at least one conductive track,
   wherein at least one portion of an exposed surface of the at least one integrated electrical component and optionally also at least one portion of an exposed surface of the at least one conductive track is continuously covered by a polymeric protective coating,
   wherein the polymeric protective coating has been applied as a wet coating to prevent residual air from being entrapped between the polymeric protective coating and the at least one integrated electrical component.

2. The composite pane according to claim 1, wherein the polymeric protective coating comprises amorphous fluoropolymers, fluorinated poly-paraxylylene, non-fluorinated poly-paraxylylene, polyurethane, polyimide, acrylic resin, epoxy resin and/or mixtures or copolymers thereof.

3. The composite pane according to claim 2, wherein the polymeric protective coating comprises acrylic resin, polyurethanes, epoxy resin and/or mixtures or copolymers thereof.

4. The composite pane according to claim 1, wherein a thickness of the polymeric protective coating is between 25 μm and 250 μm.

5. The composite pane according to claim 4, wherein the thickness of the polymeric protective coating is between 25 μm and 100 μm.

6. The composite pane according to claim 1, wherein the at least one integrated electrical component and/or the at least one conductive track are applied on the inner face of the outer pane or on the inner face of the inner pane.

7. The composite pane according to claim 1, wherein the thermoplastic interlayer comprises at least one lamination film on which the at least one integrated electrical component and/or the at least one conductive track are applied.

8. The composite pane according to claim 1, wherein the thermoplastic interlayer comprises at least one lamination film and at least one carrier foil, wherein the at least one integrated electrical component and/or the at least one conductive track are applied on the carrier foil.

9. The composite pane according to claim 1, wherein the at least one integrated electrical component has a thickness of 70 μm to 700 μm.

10. The composite pane according to claim 1, wherein the at least one electrical component is selected out of the group of LEDs, diodes, resistors, capacitors, transistors, integrated circuits, optoelectronic devices, inductors, sensors, displays, LCD devices, PDLC devices, antenna, piezoelectric elements and crystal elements.

11. The composite pane according to claim 1, wherein the at least one conductive track is implemented as paste, solid ribbon, bus bar, wire and/or thin conductive coating.

12. The composite pane according to claim 1, wherein the conductive tracks contain copper, silver, graphite, graphene, gold, aluminum, tungsten, tin, zinc and/or mixtures or alloys thereof.

13. The composite pane according to claim 1, wherein the thickness of the at least one integrated electrical component is from 100 μm to 500 μm.

14. A method for producing the composite pane according to claim 1, comprising:
   a) providing an outer pane, an inner pane, at least one lamination film and optionally a carrier foil, wherein at least one conductive track and at least one integrated electrical component are applied on the outer pane, the inner pane, the lamination film or the carrier foil,
   b) coating at least one portion of the at least one integrated electrical component and optionally at least one portion of the at least one conductive track with a polymeric protective coating,
   c) arranging a stack comprising at least the outer pane, the lamination film, optionally the carrier foil and the inner pane, wherein the at least one lamination film and the carrier foil can be arranged in any succession,
   d) joining the outer pane and the inner pane by lamination, wherein a thermoplastic interlayer is formed between the outer pane and the inner pane.

15. The method according to claim 14, wherein the polymeric protective coating is applied by brush coating, selective coating by machine, dispensing, screen printing, ink jet printing, spraying or gluing of adhesive tape.

16. The method according to claim 15, wherein the polymeric protective coating is applied by spraying.

17. The method according to claim 14, wherein the at least one integrated electrical component and the at least one conductive track are applied on the lamination film or on the carrier foil and wherein step b) is executed before or during step a).

18. A method comprising manufacturing a vehicle glazing with the composite pane according to claim 1.

19. The method according to claim 18, wherein the composite pane is a windshield.

* * * * *